June 20, 1972  J. C. GUINAN  3,671,364

FOAM TAPE APPLICATOR

Filed July 7, 1970

INVENTOR
Joseph C. Guinan
BY
Herbert L. Gatewood
ATTORNEY

United States Patent Office 3,671,364
Patented June 20, 1972

3,671,364
FOAM TAPE APPLICATOR
Joseph C. Guinan, Troy, N.Y., assignor to Norton Company, Troy, N.Y.
Filed July 7, 1970, Ser. No. 52,936
Int. Cl. B32b 31/20, 31/10
U.S. Cl. 156—574
5 Claims

ABSTRACT OF THE DISCLOSURE

Apparatus for application of foam tape is provided comprising an elongated, U-shaped body member through which the foam tape is transported and located at one end thereof is an applicator roll for applying the foam tape to a desired member.

BACKGROUND OF THE INVENTION

(1) Field of the invention

This invention relates to an apparatus for application of foam tape and to its use. More particularly, the invention relates to a hand applicator for foam tape.

(2) Description of the prior art

Over the years various means have been provided for vibration dampening of metal members and, in some instances, to also provide a moisture seal where such members are in combination with other metal members or the like. One such metal member requiring vibration dampening and moisture sealing is metal trim on various automobiles.

One solution to the problem of moisture sealing and vibration dampening in automotive trim involved heretofore application to the metal trim member of a so-called "pumpable sealer compound." Such a compound is of a nature similar to various caulking compounds often found in hardware stores and the like. Although the pumpable sealer compound has been found satisfactory for many purposes, some problems are attendant with the use of such a compound because of its very nature. Even after application, the sealer compound remains somewhat pliable. This sometimes results in the compound "oozing" out from the metal trim and, where such trim is a car roof rail, the sealer compound oozes onto the roof of the car. Obviously this presents an undesirable appearance and the sealer compound must be removed. Although in most instances the removal is merely a nuisance and requires only an additional expediture in time, effort, and materials, it presents a real problem with cars having vinyl covered roofs. Such plastic roof material precludes the use of various solvents in removal of the sealer compound.

Although it is known to utilize foam tapes as sealers and in vibration dampening, the use of these materials is sometimes avoided, particularly in automotive trim, because of the presently known methods of application of the foam tape to the metal trim. The metal trim used on automobiles in many instances is of irregular shape and application of foam tapes thereto has been entirely by hand. Such a method of application is, of course, tedious and time consuming and for these reasons, among others, foam tape has not ben readily adopted by those persons supplying trim to the automotive manufacturers.

SUMMARY OF THE INVENTION

The invention disclosed herein comprises a foam tape hand applicator for application of such a tape to various substrates and in particular to automotive trim. In its basic aspects the foam tape applicator comprises a body member through which the foam tape is transported and a rotatable applicator roll on one end of the body member by means of which the tape is pressed into contact with the surface to which it is to be applied.

Quite advantageously the applicator apparatus herein disclosed makes possible the application of foam tape to various irregular shaped metal trim rapidly, easily, and economically.

BRIEF DESCRIPTION OF THE DRAWING

The invention is described hereinafter in greater detail by reference to the drawing in which.

DETAILED DESCRIPTION OF THE INVENTION

Figure 1:
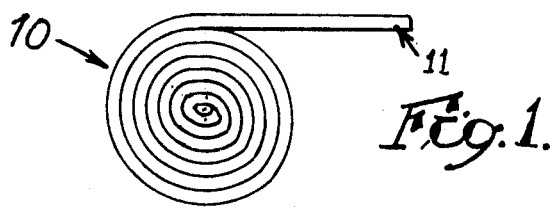
FIG. 1 is an end view of a roll of foam tape which is applied to metal trim by means of the hand applicator of this invention.

Turning to the drawing, there is disclosed in FIG. 1 thereof a roll 10 of foam tape 11 which is applied to some desired substrate by means of hand applicator 12 (FIG. 3) hereinafter described in greater detail.

Figure 2:
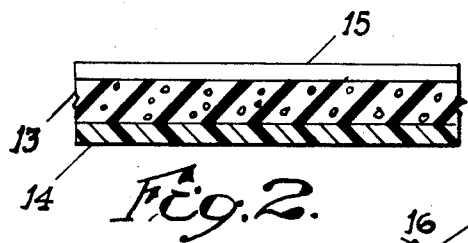
FIG. 2 is a portion of the foam tape of FIG. 1 showing in greatly enlarged size the components thereof.

Foam tape 11, as more clearly seen in FIG. 2, comprises a foam backing member 13 having on the front side thereof a pressure-sensitive adhesive layer 14. An interliner 15 is interwound with the tape 11 thereby to prevent undesirable adhesion between the backing member 13 and adhesive layer 14 in roll form and to provide desirable unwind characteristics. In some instances, rather than an interliner a release coating is provided on the back surface of the backing member. Such foam tapes are available commercially in various widths, thicknesses, and densities of various materials and require no detailed explanation herein. One such foam tape comprises vinyl chloride foam and is available commercially from Norton Company under the trade designation "Bear Vinyl Foam Tape."

Figure 3:
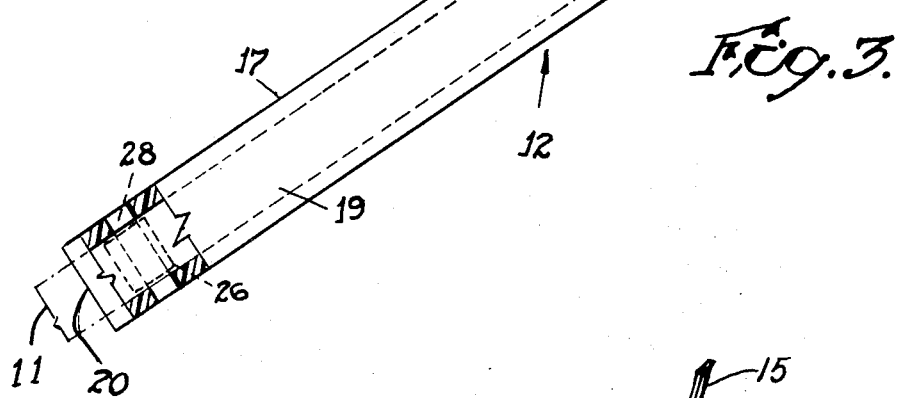
FIG. 3 is a view in perspective showing the foam tape hand applicator of my invention.

Foam tape hand applicator 12 according to the invention and as more clearly shown in FIG. 3 of the drawing comprises an elongated body member 16 having sides 17 and 18. Sides 17 and 18 depend from, preferably vertically, and are integral with base 19. However, quite obviously, such sides and base can be separately made and merely attached together by some suitable fastening means if desired. Thus, it is seen that in the preferred embodiment of the invention elongated body member 16 in looking down its length from feed end 20 has a generally U-shaped cross section. Attached at the discharge end 21 of the applicator 12 to side 17 is an applicator roll 22.

Sides 17 and 18, as shown in the drawing, extend beyond the discharge end of base 19. This provides, as will be readily understood, a clearance between the base member and applicator roll 22 by means of which foam tape 11 can be threaded in the proper manner around the applicator roll. The extended portion of side 18, moreover, provides a guide which aids to retain foam tape 11, during application, on the applicator roll. Although shown in FIG. 3 is what one might term a "left-hand" applicator in that one using such, during use, would hold the applicator in his left hand, it will be readily recognized that a "right-hand" applicator can also be provided in accordance with the invention. Such an applicator is shown being used in FIG. 4. One can easily see that in a so-called right-hand applicator, the applicator roll is attached to the side opposite that shown in FIG. 3, and in a similar manner as hereinafter explained.

Figure 4:
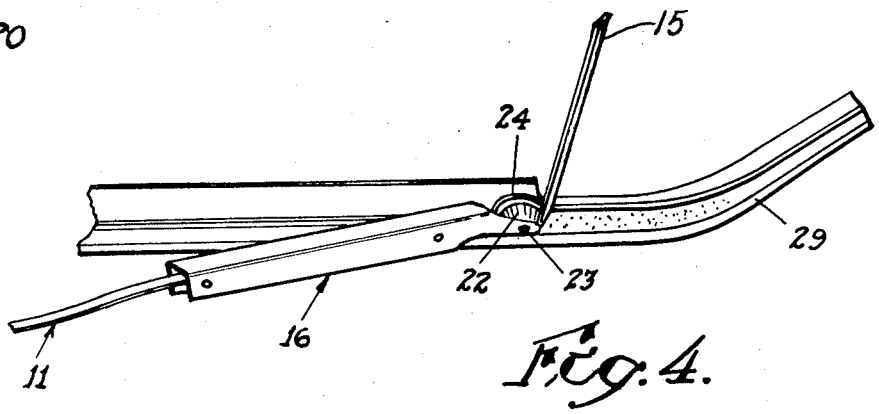
FIG. 4 is a view in perspective showing use of the applicator in application of foam tape to an automotive roof rail.

Applicator roll 22 (FIG. 3) is freely rotatable and is secured to the end of side 17 by means of a pin 23 generally in the shape of a rivet. In usage, applicator roll 22 presses against the backing member of the foam tape and presses it by means of the pressure-sensitive adhesive layer into intimate, sealing contact with the surface on which the tape is applied. Applicator roll 22 is mounted at such an angle on, and the discharge end of side 17 is so angled, that in pressing the foam tape against the surface of application, the roll describes an imaginary plane parallel to the surface on which the tape is applied. Although the applicator roll in certain instances may be of a cylindrical shape, in many instances e.g. when tape is being applied to automotive trim of irregular cross-section, a frusto-conical shape as shown will be necessary for ease of and proper tape application. In such instances, the particular frustrum desired, i.e. angle made with the roller base will, of course, depend upon the particular cross-section involved and the surface on which the tape is to be applied. However, selection of the proper shape applicator roll and determining in what manner it should be mounted on the elongated body member is believed well within engineering skill. It should be, however kept in mind that such a roll in use must describe an imaginary plane parallel to the surface of application. In certain instances, this will require the discharge end 21 of side 17 to extend at a complex angle with respect to the elongated body member. This being the case, the elongated body member and the discharge end 21 on which the roll is mounted will be at different angles with respect to the axis of the applicator roll. This permits, as shown in FIG. 4, proper and easy insertion of the applicator in the automotive trim panel for application of the foam tape.

A circular-shaped rotatable guide member 24 fixed for rotation in combination with applicator roll 22 is located on the side of the roll opposite from side 17 as shown. Guide member 24 permits, in combination with the applicator roll, the foam tape to be applied and secured in a certain desired location. The rotatable guide member prevents, particularly in combination with the extended portion of side 18, lateral displacement of the foam tape during application. Such is particularly significant with respect to automotive trim as the foam tape often tries to ride-out of the channel in which the tape is being applied. A further and very desirable feature of guide member 24 results from the fact that it makes movement of the hand applicator easier than without such a guide member.

Guide rolls 25, 26, which desirably are provided with a knurled surface are located at opposite ends of body member 16 as shown. These rolls are spaced away from base 19 a sufficient distance to allow passage of tape 11 as hereinafter described. Guide rolls 25, 26 are secured to sides 17, 18, as shown, by means of pins 27, 28, respectively. These pins permit free rotation of the guide rolls during application of the foam tape.

Body member 16 can be manufactured from various materials of construction, e.g. metal, wood, plastic, etc.; however, it preferably and most desirably is manufactured from plastic. When manufactured of plastic material, one need be less concerned that inadvertent scratching, denting and the like of the metal trim by the applicator will occur. Several plastic materials suitable for manufacture of the body member are readily available on the market, e.g., nylon, polyacetal resins such as Delrin and Celcon, polyethylene and the like. Although the body member used in the practice of this invention has been milled from a solid plastic material, e.g. a block or cylinder of nylon, such can just as readily be molded into the desired shape by means well known in the art. Guide member 24 is desirably manufactured from the same plastic material as is the body member. Applicator roll 22 preferably is of metal.

The variety of shapes and sizes of trim panels and the like will obviously preclude a so-called universal applicator. In other words, an applicator suitable for use in one application may be less suitable, or for that matter even unsuitable for use in another application. This may be because a wider or narrower foam tape is to be applied, or the trim panel is of larger or smaller size or of radically different shape. The size of the various components of the applicator will obviously depend upon the size and shape of trim panel or the like on which tape is to be applied. One must, for example, use an applicator roll having a diameter which will allow insertion in the desired location for application of tape to the metal trim. Obviously, the applicator roll must be of sufficient width to allow for the tape width and width of surface on which tape is to be applied. Once the roll size is determined, one can readily ascertain of what size must be the body member and its components.

In utilizing a hand applicator in accordance with my invention, the free end of a roll 10 of foam tape 11 (FIG. 1) is fed into the feed end 20 of the body member 16 between guide roll 26 and base 19. The tape, interliner is against base 19, then passes along base 19 and between such and guide roll 25. The applicator is then ready for insertion in the trim panel as shown in FIG. 4 for application of the tape to the desired surface. The end of the foam tape is then pulled under and around applicator roll 22. Interliner 15 is separated as shown, from the tape by hand as applicator 12 is moved by one's other hand along the trim panel 29. This movement quickly and easily presses, by means of the applicator roll, the foam tape into intimate sealing contact with the desired surface. As the peripheral surface of applicator roll 22 describes a plane parallel to the surface on which the tape is applied, this insures more uniform pressure and contact between the foam tape and this surface. The applicator roll being at an angle with respect to the body member permits proper insertion of the tape applicator in the trim panel 29 and permits easy movement of such along the trim panel during use. The applicator roll and body member being so angled, moreover precludes the operator from injuring his fingers while gripping the applicator and operating it to apply the foam tape.

As many different embodiments of my invention will occur to those skilled in the art, it is to be understood that the specific embodiment of the invention as presented herein is intended by way of illustration only and not limiting upon the invention, but that the limitations thereon are to be determined only from the appended claims.

What I claim is:

1. Apparatus for application of foam tape to a surface comprising:
    (a) an elongated body member comprising a base and two sides having a feed end and a discharge end, said sides being spaced apart and depending from said base along which foam tape travels from a source of supply for application to said surface yet being noncoextensive in length with said base and extending therebeyond at the discharge end, one of said sides being of greater length than the other;
    (b) an applicator roll affixed to said side of greater length at the discharge end and being freely rotatable; and
    (c) a circular-shaped guide member rotatable in combination with said applicator roll being located on the side of the roll opposite said side of greater length.

2. Apparatus according to claim 1 wherein said spaced apart sides vertically depend from said base.

3. Apparatus according to claim 2 wherein said elongated body member further comprises:
    (a) a first rotatable guide roll located adjacent said feed end, the axis of which is parallel to said base; and (b) a second rottable guide roll located adjacent said discharge end, the axis of which is also located parallel to said base the location of each of said guide rolls being so as to permit passage of tape between it and said base.

4. Apparatus according to claim 3 wherein said applicator roll on rotating describes an imaginary planar surface parallel to the surface on which the foam tape is applied.

5. Apparatus according to claim 4 wherein said applicator roll is of frusto-conical shape and is affixed to the side at such an angle as to permit the applicator to be used in applying such tape to surfaces of irregular shape.

References Cited

UNITED STATES PATENTS

| | | | |
|---|---|---|---|
| 3,051,223 | 8/1962 | Waltz | 156—527 |
| 3,325,336 | 6/1967 | Gibson | 156—577 |

FOREIGN PATENTS

| | | | |
|---|---|---|---|
| 382,835 | 11/1932 | Great Britain | 156—574 |

BENJAMIN A. BORCHELT, Primary Examiner

J. M. HANLEY, Assistant Examiner

U.S. Cl. X.R.

156—238